United States Patent
Lo et al.

(10) Patent No.: US 9,112,983 B2
(45) Date of Patent: Aug. 18, 2015

(54) BLUETOOTH DATA/CONTROL MESSAGE TRANSMISSION MODULE, INTERACTION SYSTEM AND METHOD THEREOF

(71) Applicant: Generalplus Technology Inc., Hsinchu (TW)

(72) Inventors: Li Sheng Lo, Zhubei (TW); Chih Hsiang Yang, Chang Hua County (TW); Cheng-Chiang Liu, Hsinchu County (TW); Chih-Hao Liang, Hsinchu (TW)

(73) Assignee: GENERALPLUS TECHNOLOGY INC., Hsinchu (TW)

(*) Notice: Subject to any disclaimer, the term of this patent is extended or adjusted under 35 U.S.C. 154(b) by 93 days.

(21) Appl. No.: 14/147,469

(22) Filed: Jan. 3, 2014

(65) Prior Publication Data

US 2014/0349576 A1  Nov. 27, 2014

(30) Foreign Application Priority Data

May 24, 2013  (TW) .............................. 102118504 A

(51) Int. Cl.
*H04B 7/00* (2006.01)
*H04M 1/60* (2006.01)

(52) U.S. Cl.
CPC ........ *H04M 1/6066* (2013.01); *H04M 2250/02* (2013.01)

(58) Field of Classification Search
CPC ... H04M 1/6066; H04M 2250/02; H04B 7/26
USPC .......... 455/41.2, 569.1, 550.1, 41.1, 563, 570
See application file for complete search history.

(56) References Cited

U.S. PATENT DOCUMENTS

| | | | |
|---|---|---|---|
| 8,018,913 B2* | 9/2011 | Rofougaran | 370/347 |
| 8,031,651 B2* | 10/2011 | Rofougaran | 370/321 |
| 8,885,011 B2* | 11/2014 | Zhong et al. | 348/14.02 |
| 9,031,604 B2* | 5/2015 | Desai et al. | 455/552.1 |
| 2008/0123610 A1* | 5/2008 | Desai et al. | 370/339 |

* cited by examiner

*Primary Examiner* — Marceau Milord
(74) *Attorney, Agent, or Firm* — Muncy, Geissler, Olds & Lowe, P.C.

(57) ABSTRACT

A Bluetooth data/control message transmission module, an interaction device and a method thereof are provided in the present invention. The Bluetooth data/control message transmission module connects to a mobile device with Bluetooth. The Bluetooth data/control message transmission module includes a process unit, a modulation module and a Bluetooth module. The process unit is for providing a digital data. The modulation module receives the digital data and modulates the digital data with a analog carrier signal to generate a modulation signal whose frequency is lower than 8 KHz. The Bluetooth module uses a headset profile to link with the mobile device, wherein the mobile device serves the Bluetooth module as a headset. The Bluetooth module samples the modulation signal, to serve the sampled modulation signal as a voice signal to send to the mobile device through the Bluetooth protocol.

18 Claims, 5 Drawing Sheets

BLUETOOTH DATA/CONTROL MESSAGE TRANSMISSION MODULE, INTERACTION SYSTEM AND METHOD THEREOF

This application claims priority of No. 102118504 filed in Taiwan R.O.C. on May 24, 2013 under 35 USC 119, the entire content of which is hereby incorporated by reference.

BACKGROUND OF THE INVENTION

1. Field of the Invention

The invention relates to a transmission method for control message or data, and more particularly to a Bluetooth data/control message transmission module, an interaction system and method thereof which is compatible with variable different devices.

2. Related Art

Mobile device has become indispensable for 3C products because of the popularity of mobile device and it's multiple and powerful functions. However, due to the integration of software and hardware in mobile device, mobile device is difficult to classify in electronic products, such that mobile device becomes powerful PC. Mobile device is not only used for telephone, transmitting message, but for exploring internet, listening music, navigation, even for entertainment. Thus, mobile device and our daily life are inseparable. Bluetooth is a communication technology for connection and data-transmission between multiple digital devices in short distance without cord requirement. Bluetooth is originally adopted for transmission between cellphone and earphone. In present, it has been widely used in smartphones and personal computers and other mobile devices However, in general Bluetooth file transfer or control, it requires that the file transfer profile is supported in the Bluetooth chip of mobile devices. Moreover, due to the limitation of operation system of the mobile device, the file transmission and control of Bluetooth may not be performed because of the different operation systems in different mobile devices, such as iOS of Apple and Android of Google. Bluetooth support in Android is different from Bluetooth support in iOS. The hardware for iOS has to pass the MFi identification, and then the Bluetooth App development resource can be obtained. However, Bluetooth support in Android OS is open standard.

Due to the abovementioned situation, the interaction product manufacturer must respectively produce product for iOS and product for Android. However, end-user may purchase the wrong product because of confusion. In addition, end-user may complain because of incompatibility of product.

SUMMARY OF THE INVENTION

In view of the above-identified problems, it is therefore an object of the invention to provide a Bluetooth data/control message transmission module. The module can compatible with different devices for data/message transmission.

Another object of the invention is to provide an interaction system for interacting with mobile device having Bluetooth function.

The other object of the invention is to provide a Bluetooth data/control message transmission method for compatibility with different devices for data/message transmission.

To achieve the above-identified object, the invention provides a Bluetooth data/control message transmission module, for connecting a mobile device through a Bluetooth protocol. The Bluetooth data/control message transmission module includes a process unit, a modulation module and a Bluetooth headset module. The process unit is for providing a digital data. The modulation module is coupled to the process unit, receiving the digital data, for modulating a digital data with an analog carrier signal to generate a analog modulated signal, wherein a frequency of the analog modulated signal is lower than an audio frequency. The Bluetooth headset module is coupled to the modulation module, wireless-connected to the mobile device using a headset profile, wherein the mobile device identifies the Bluetooth headset module as a headset intercom. The Bluetooth headset module samples the analog modulated signal to obtain a Bluetooth audio sampled data, and the Bluetooth headset module serves the Bluetooth audio sampled data as a voice data, and transmits the Bluetooth audio sampled data to the mobile device by the headset profile. The mobile device performs the analog-to-digital conversion and the demodulation to the Bluetooth audio sampled data to obtain the digital data.

A Bluetooth data/control message transmission method is provided for connecting a mobile device through a Bluetooth protocol. The Bluetooth data/control message transmission method includes the steps of: using a headset profile to wirelessly connect to the mobile device; receiving a digital data; modulating a digital data with a analog carrier signal to generate a analog modulated signal, wherein a frequency of the analog modulated signal is lower than an audio frequency; sampling the analog modulated signal, to obtain a Bluetooth audio sampling data; and transmitting the Bluetooth audio sampling data to the mobile device in audio form of headset profile, wherein the mobile device performs a analog-to-digital conversion to the received Bluetooth audio sampling data, and then performs demodulation to obtain the digital data.

An interaction system is provided. The interaction system includes a mobile device and an interaction device. The mobile device has a application software, wherein the mobile device supports Bluetooth protocol. The interaction device includes a Bluetooth data/control message transmission module. The Bluetooth data/control message transmission module includes a process unit, a modulation module and a Bluetooth headset module. The process unit is for providing a digital data. The modulation module is coupled to the process unit, receiving the digital data, for modulating a digital data with a analog carrier signal to generate an analog modulated signal, wherein a frequency of the analog modulated signal is lower than an audio frequency. The Bluetooth headset module is coupled to the modulation module, wireless-connected to the mobile device using a headset profile, wherein the mobile device identifies the Bluetooth headset module as a headset intercom. The Bluetooth headset module samples the analog modulated signal to obtain a Bluetooth audio sampled data, and the Bluetooth headset module serves the Bluetooth audio sampled data as a voice data, and transmits the Bluetooth audio sampled data to the mobile device by the headset profile. The mobile device performs the analog-to-digital conversion and the demodulation to the Bluetooth audio sampled data to obtain the digital data. The mobile device displays a specific image on the screen of the mobile device according to the digital data and the performing application software.

According to an preferred embodiment of the present invention, the Bluetooth headset module includes a microphone port, and the sample rate for the microphone port substantially is 8 KHz, and the frequency of the analog modulated signal is lower than 4 KHz. Also, in another preferred embodiment, before the analog modulated signal is transmitted, the Bluetooth headset module establishes a synchronous connection oriented link (SCO link) with mobile device. In addition, when the Bluetooth headset module receives a second Bluetooth audio sampled data, the Bluetooth headset module performs a digital-to-analog conversion to the second Bluetooth audio sampled data to obtain a analog signal, and the Bluetooth data/control message transmission module further includes a demodulation module, coupled to the Bluetooth headset module and the process unit, for performing a signal demodulation to the analog signal by using the analog carrier signal to obtain a demodulated digital data, wherein the process unit performs a specific operation according to the demodulated digital data.

The spirit of the present invention is to use the headset profile in Bluetooth protocol, which is widely supported for most mobile device, to perform data transmission. Since each mobile device is practically compatible with Bluetooth device with headset profile. Thus, the device using the present invention has high compatibility. However, the headset profile is only adapted for audio transmission of earphone/microphone. In other words, the headset profile is purely designed for audio transmission. The present invention can perform data transmission through the headset profile.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
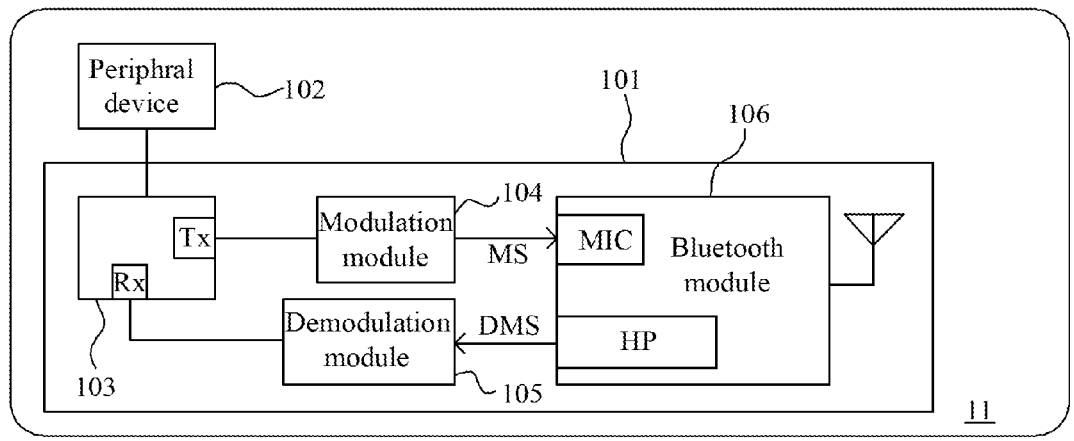
FIG. 1 illustrates a diagram depicting an interaction system according to a preferred embodiment of the present invention.
Figure 1:
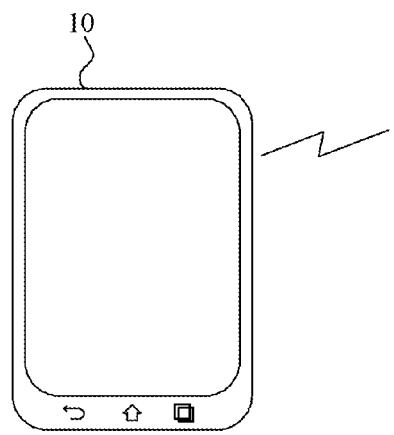

FIG. 1 illustrates a diagram depicting an interaction system according to a preferred embodiment of the present invention. Referring to FIG. 1, the interaction system includes a Bluetooth supported mobile device 10 and an interaction device 11. The interaction device 11 includes a Bluetooth data/control message transmission module 101 of a preferred embodiment of the present invention and a peripheral device 102. The Bluetooth data/control message transmission module 101 in the embodiment includes a process unit 103, a modulation module 104, demodulation module 105 and a Bluetooth headset module 106. The transmitting port Tx of the process unit 103 is coupled to the modulation module 104. The receiving port Rx of the process unit 103 is coupled to the demodulation module 105. The modulation module 104 is coupled to the microphone port MIC of the Bluetooth headset module 106. The demodulation module 105 is coupled to the head-phone port HP of the Bluetooth headset module 106. In this embodiment, the mobile device 10 of the present embodiment uses the smartphone for example. However, people having ordinary skill in the art should know that the mobile device 10 can be a laptop computer, tablet computer, and so on. The present invention is not limited thereto.

Before the operation, the mobile device 10 establishes a Bluetooth connection with the interaction device 11, and also establishes a synchronous connection oriented Link (SCO link) with the interaction device 11. The mobile device 10 would determine that the interaction device is a Bluetooth Headset, that is, Bluetooth microphone with headphone. User may install an application software into the mobile device 10. The mobile device 10 is used for capture the audio data from the interaction device 11 through Bluetooth protocol and then decoding the audio data. When there is no transmission between the mobile device 10 and the interaction device 11, the mobile device 10 and the interaction device 11 may enter the standby mode to shutdown part of the internal circuit to save power.

In order to clearly describe the spirit of the present invention, assuming that the interaction device 11 is an electronic sphygmomanometer first in the following embodiment. And also assuming that the peripheral device 102 is a blood pressure measuring device. In this embodiment, the electronic sphygmomanometer transmits the measured blood pressure data to the mobile device 10 through the Bluetooth data/control message transmission module 101.

When a user operates the interaction device 11 to start measuring the blood pressure, the process unit 103, the process unit 103 controls the peripheral device 102 to perform the blood pressure measurement according to the user's operation. When the blood pressure measurement is finished and the measured data thereof is obtained, the peripheral device 102 may first display the result to the screen (Not illustrated), and then peripheral device 102 may transmit the measured data to the process unit 103 to proceed the following Bluetooth transmission. The process unit 103 divides the measured data into a plurality of bit streams and then transmits the bit streams to the modulation module 104 from the transmitting port Tx. The modulation module 104 modulates the measured data with an audio frequency to obtain an analog modulated signal MS. The analog modulated signal MS is transmitted to the microphone port MIC of the Bluetooth headset module 106. Since the microphone port MIC of the Bluetooth headset module 106 is used for receiving general telephone voice, the sample rate of the microphone port MIC of the Bluetooth headset module 106 is about 8 KHz. According to sampling theorem, the frequency of the analog modulated signal MS cannot be higher than 4 KHz.

When the Bluetooth headset module 106 has data to be transmitted, the ring command is sent to the mobile device 10 to establish data link. When the mobile device 10 receives the ring command, the mobile device 10 enters the normal mode from the standby mode, and responds "OK for transmitting" to the Bluetooth headset module 106. At this time, the SCO link is established between the Bluetooth headset module 106 and the mobile device 10. After the Bluetooth headset module 106 receives the analog modulated signal, the analog modulated signal MS is sampled to obtain a Bluetooth audio sampled data. Afterward, the Bluetooth headset module 106 transmits the Bluetooth audio sampled data by using RF radio through 802.15 standard protocols.

The mobile device 10 receives the Bluetooth audio sampled data through 802.15 standard protocols. And, through the abovementioned application software, demodulating the Bluetooth audio sampled data to obtain the result of the measured blood pressure data.

In the abovementioned embodiment, the microphone port MIC of the Bluetooth headset module 106 is used for receiving voice. However, in practical terms, to play the voice of the analog modulated signal MS and then to receive the voice by the microphone connected to the microphone port MIC of the Bluetooth headset module 106 may not be necessary. If the analog modulated signal is played in voice form, it may an unpleasing sound. In order to prevent the unpleasing sound listening by user, in this embodiment, the modulation module 104 can transmit the analog modulated signal MS to the microphone port MIC of the Bluetooth headset module 106 for example in electrical form through the copper foil of the print circuit board.

In the abovementioned embodiment, the interaction device 11 transmits the measured data to the mobile device is described and the interaction device interacting with mobile device is served as exampled. In the following embodiment, the mobile device transmits data to the interaction device 11 would be described.

Figure 2:
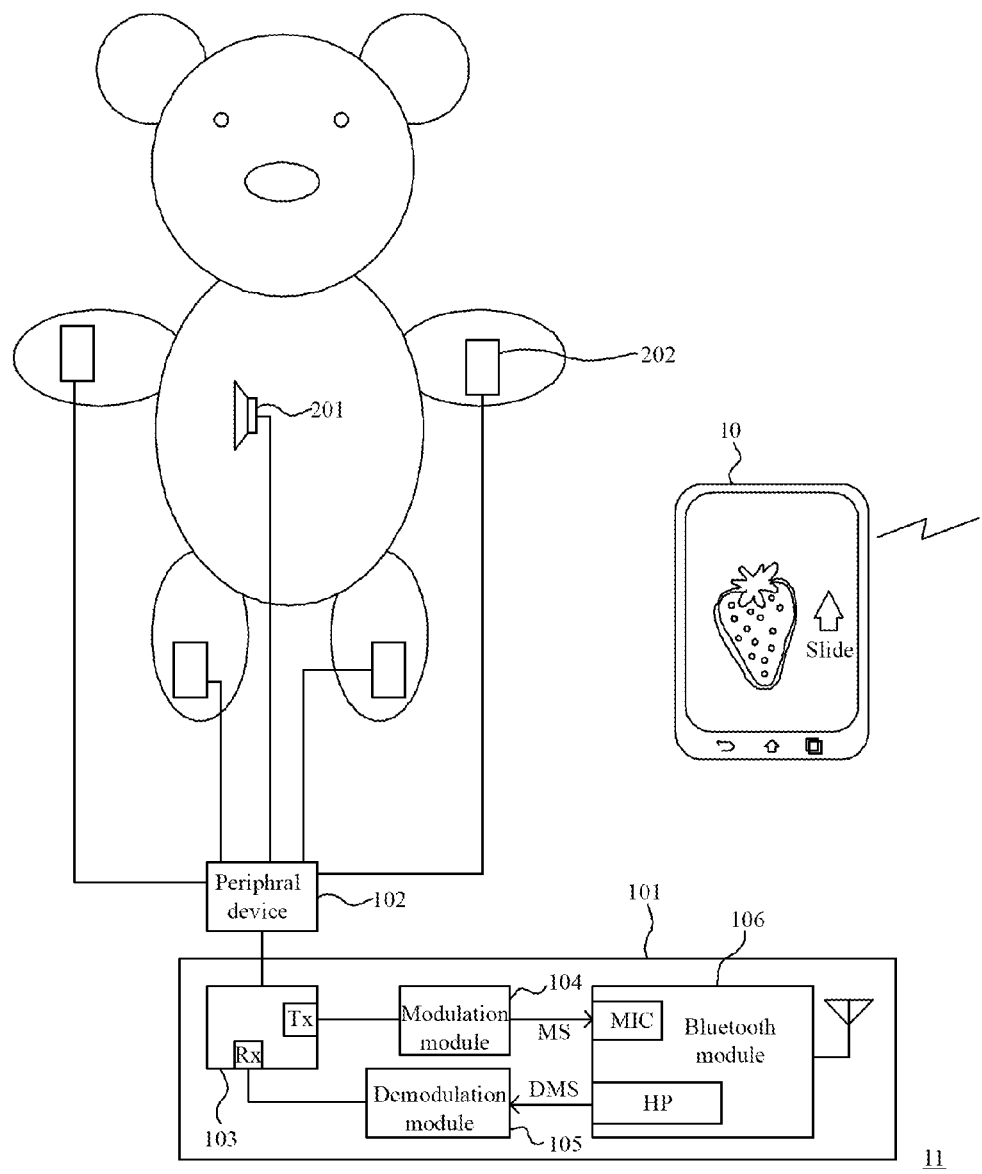
FIG. 2 illustrates a diagram depicting an interaction toy according to a preferred embodiment of the present invention.

In order to describe the spirit of the present invention, assuming that the interaction device 11 of the present embodiment is an interaction toy, and the mobile device 10 is a smartphone, as shown in FIG. 2, FIG. 2 illustrates a diagram depicting an interaction toy according to a preferred embodiment of the present invention. Referring to FIG. 2, in the present embodiment, the appearance of the interaction device 11 is in a bear cub form, and the peripheral device 102 includes a speaker 201 and the mechanism 202 for driving the motion of the bear cub.

In the present embodiment, interaction application software is already installed into the smartphone for example. When a user operates the application software on the smartphone 10, user can use "feeding command" of the application software, and according to the instruction on the screen, user can use a touch operation to the food image, such as sliding the strawberry image on the screen. Afterward, the application software packs the corresponding control message into a package. Next, the package is modulated with the abovementioned analog carrier signal in the audio frequency to generate a analog modulated signal MS, and then the Bluetooth module of the smartphone 10 would sample the analog modulated signal MS. Afterward, the Bluetooth module of the smartphone 10 sends the ring command to the interaction toy 11 to wake the Bluetooth headset module 106 of the interaction toy 11. And then the SCO link is established.

After establishing the SCO link, the Bluetooth headset module 106 of the interaction toy 11 receives the Bluetooth audio sampled data, that is the sampled analog modulated signal MS. Since the analog modulated signal MS is transmitted in voice form, the Bluetooth headset module 106 would perform a digital-to-analog conversion to the Bluetooth audio sampled data to obtain a analog signal DMS, the headphone port HP of the Bluetooth headset module 106 outputs the analog signal DMS to the demodulation module 105. After the demodulation module 105 receives the analog signal DMS, the demodulation module 105 demodulates the analog signal DMS with the analog carrier signal to obtain a demodulated digital data. Afterward, the demodulation module 105 transmits the demodulated digital data to the process unit 103. According to the demodulated digital data, the process unit 103 controls the peripheral device 102 to generate a corresponding response, such as performing the eating movement and playing "yummy" from the speaker.

The abovementioned embodiment, the modulation/demodulation is described. Since the headset profile of the Bluetooth is mainly used for transmitting voice signal. However, in the present invention, the control message and the digital data are modulated in the voice signal, and then the modulated voice signal is transmitted through the conventional Bluetooth module. Thus, no extra fee would be spent for hardware implementation. And the transmission for data and control message can be achieved.

In the abovementioned embodiment, the analog modulated signal MS of the transmitter can add a header for representing that the following information is a digital data or a control message. After Bluetooth module of the receiver demodulates the received RF signal and obtains the analog signal DMS, it would determine whether a specific header exists in the analog signal DMS. If the analog signal DMS has the specific header, the receiver would performs demodulations to the analog signal DMS by the demodulation module 105 to obtain the digital data or the control message in the analog signal DMS, and performs the corresponding response. In other words, If a header is add to the analog modulated signal MS, the Bluetooth module of the transmitter or receiver still can be operated the conventional headset to transmit the general voice data. Meanwhile, when the receiver determines that the analog signal DMS has the specific header, the receiver can prohibit to play the analog signal DMS. Thus, user would not hear the analog signal DMS with specific information.

The abovementioned modulation method is for transmitting control message or digital data. The modulation method in the present invention also can be used for transmitting voice. In the following embodiment, the voice transmission is taken as an example.

Assuming that the interaction toy 11 can be named and set its favorite fruit and color by a purchaser or a user after leaving the factory. User can performs the application software on the smartphone 10 to perform the initial setting of the interaction toy 11. At this time, the application software may request user to start a voice input. In this embodiment, user sequentially speaks "Mary", "strawberry", "red" to the microphone of the smartphone. Afterward, the application software respectively adds the headers and the trailer to the abovementioned three voices, wherein the header includes a control code to represent the voice setting pattern, and the trailer represents end of voice. Next, the application software would transmit the voice data with added header and trailer through the headset profile of Bluetooth.

When the Bluetooth headset module 106 of the interaction toy 11 receives the RF signal transmitting through the headset profile of Bluetooth, the RF signal would be demodulated and preformed digital-to-analog conversion to obtain an analog voice signal. And then, the analog voice signal is transmitted to the demodulation module 105. The demodulation module 105 starts to determine whether there is a voice setting pattern in the header. When there is a voice setting pattern in the header, the signal following the header would be served as voice setting information and be transmitted to the process unit 103. According to the header, the process unit 103 correspondingly stores or plays the received voice.

According to the abovementioned embodiment, the voice setting pattern in the header at least includes three kinds. The first voice setting pattern represents "name", the second voice setting pattern represents "fruit", and the third voice setting pattern represents "color". When the process unit 103 receives the three headers, it would respectively record the voices after the three headers. Through the sitting process, when a user uses a specific operation to ask the name of the interaction toy 11, the interaction toy 11 would respond "Mary" according to the stored voice.

The abovementioned embodiment describes the data transmission using the Bluetooth headset module supported by a plurality of mobile device through the audio bandwidth. In addition, the abovementioned embodiment is for explanation, the embodiments of present invention are not limited to the forms of bear cub and electronic sphygmomanometer. Thus, the present invention is not limited thereto. Furthermore, the header may a sinusoidal wave with specific frequency or specific pattern wave or their combination. As long as the receiver can identify the differences of the waveforms, the waveforms can be used to serve as headers. Thus, the present invention is not limited thereto. Moreover, in the abovementioned embodiment, although the voice setting information is stored by the process unit, people having ordinary skill in the art should know that the voices also can be directly played. People having ordinary skill in the art can use the different designs for the received voice setting information according to different applications. Thus, the present invention is not limited thereto.

According to the abovementioned embodiment, the present invention uses the technology for transmitting voice to transmit digital data, control message, voice data and setting information. In order to reduce the error rate, in this embodiment, the transmission data has to be packed to a package. In this embodiment, the package form is shown as following table 1:

TABLE 1

| Header | Data | Check | Trailer |

The header field is used to convey sync information. The data field is designated 8 bits. The check field is used to convey an error check code according to the data in the data field. Generally, the error check code is parity check. The trailer field is an "End" symbol. In the present embodiment, the parity check is even parity check code. For example, it is assumed that the data is "0000 0001", and there is one "1", and the parity bit has to be "1" such that the total number "1" would be even number. Therefore, the total package would be "Sync+00000001+1+End".

Table 2 is the modulation method in the present embodiment of the present invention. Referring to Table 2, the transmission method in this embodiment uses "tone" and "silence" to respectively represent the logics. Sync is represented as 1 ms tone and 3 ms silence. Logic "0" is represented as 1 ms tone and 1 ms silence. Logic "1" is represented as 1 ms tone and 2 ms silence. End is represented as 1 ms tone and 1 ms silence.

TABLE 2

| Symbol | Combination |
|---|---|
| Sync | 1 msec tone + 3 msec silence |
| Logic '0' | 1 msec tone + 1 msec silence |
| Logic '1' | 1 msec tone + 2 msec silence |
| End | 1 msec tone + 1 msec silence |

Figure 3:
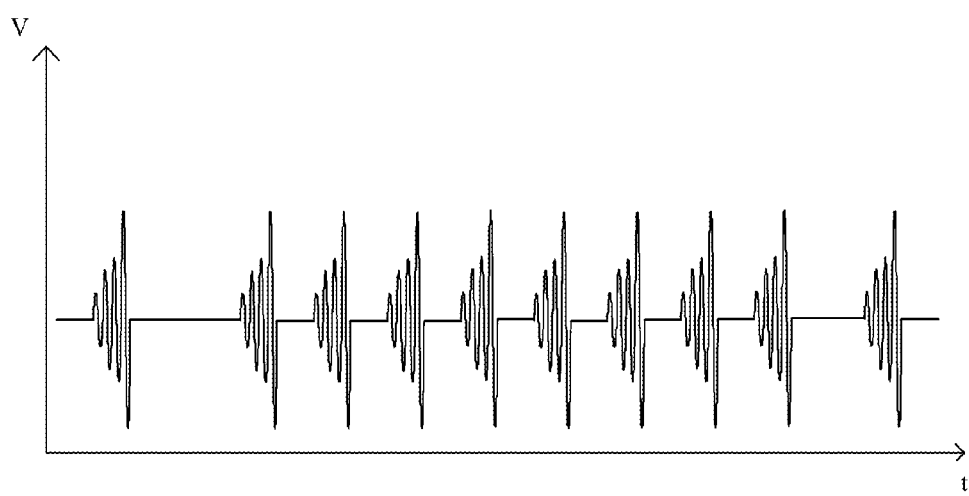
FIG. 3 illustrates a waveform depicting the modulation of the Bluetooth data/control message transmission module and the interaction system according to a preferred embodiment of the present invention.

FIG. 3 illustrates a waveform depicting the modulation of the Bluetooth data/control message transmission module and the interaction system according to a preferred embodiment of the present invention. Referring to FIG. 3, the waveform represents the abovementioned modulated package "Sync+00000001+1+End". According to the waveform, in the beginning, a 1 ms tone is generated, and then the waveform is silent for 3 ms. Afterward, 1 ms tone and 1 ms silence are sequentially generated, and continuously shows 7 times. Next, 1 ms tone and 2 ms silence are sequentially generated twice for representing Logic "1" and parity bit. At the end, 1 ms tone and 1 ms silence are generated for representing End.

Although the abovementioned embodiment adopts a special modulation method, people having ordinary skill in the art should know that the modulation method can be modified for different designs. Designers can adopt a modulation, such as Amplitude Shift Keying (ASK), Frequency Shift Keying (FSK), On-Off Keying (OOK), and so on. Thus, the present invention is not limited thereto. In addition, in the embodiment for the voice, the interaction system can use the same voice channel to perform data or voice transmission. When the demodulation module receives the signal whose header is Sync, the demodulation module determines that the signal following the Sync is 8 bits data. When the demodulation module receives the signal whose header is voice setting pattern header, the demodulation module determines that the signal following the voice setting pattern header is a voice setting information. Moreover, the 8 bits data in the abovementioned embodiment is an example such that people having ordinary skill in the art can understand the spirit of the present invention. People having ordinary skill in the art can design a different data length according to the requirement of the product. Thus, the present invention is not limited thereto. Furthermore, in the abovementioned embodiment, the parity check is adopted to serve as the error check code. However, people having ordinary skill in the art should know that the cyclic redundancy code (CRC) check, Hamming code check or other are also can be adopted to serve as the error check code. Therefore, the present invention is not limited thereto.

Figure 4:
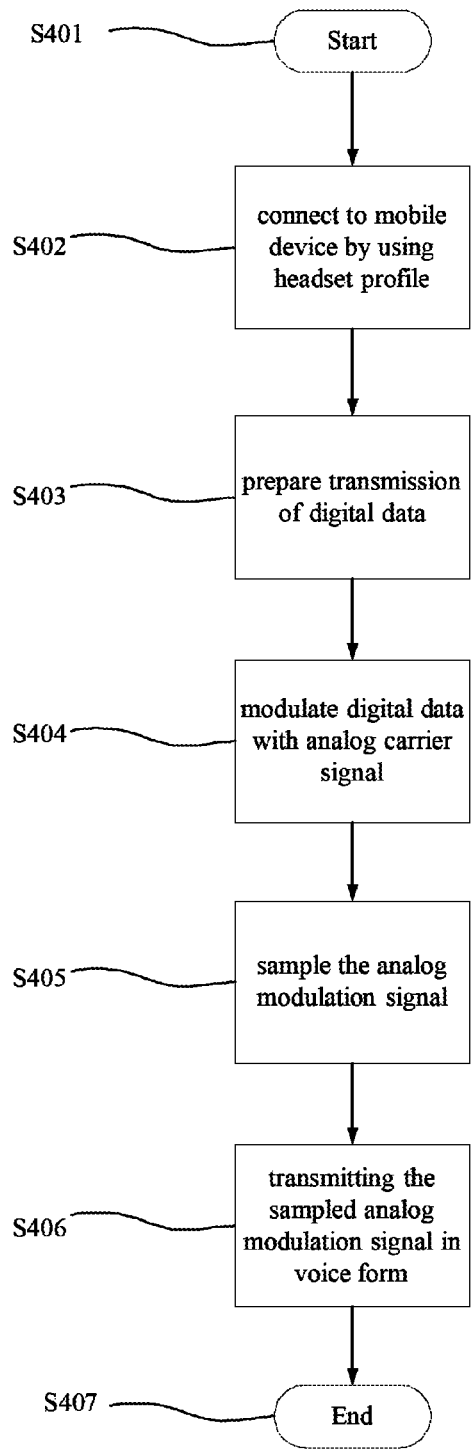
FIG. 4 illustrates a flowchart depicting the Bluetooth data/control message transmission method according to a preferred embodiment of the present invention.

The abovementioned embodiment can be summarized to a Bluetooth data/control message transmission method. FIG. 4 illustrates a flowchart depicting the Bluetooth data/control message transmission method according to a preferred embodiment of the present invention. Referring to FIG. 4, the Bluetooth data/control message transmission method uses transmitting data to the mobile device from the interaction device for example. The Bluetooth data/control message transmission method includes the steps of:

In step S401, the method starts.

In step S402, a headset profile is used to wirelessly connect with the mobile device. In the abovementioned embodiment, the mobile device is wirelessly connected to the interaction device through Bluetooth.

In step S403, transmission of digital data is prepared. The digital data to be transmitted is transferred from the process unit 103 to the modulation module 104.

In step S404, a digital data is modulated with an analog carrier signal to generate an analog modulated signal.

In step S405, the analog modulated signal is sampled to obtain a Bluetooth audio sampled data. Generally speaking, the sampling method is implemented by Analog-to-Digital Conversion (ADC). In order to conform to headset profile of Bluetooth, the analog modulated signal has to be sampled by using voice form, that is, the analog modulated signal should be served as a voice signal. The sample rate of voice is 8 KHz. In other words, the frequency of the analog modulated signal should be not greater than 4 KHz.

In step S406, the Bluetooth audio sampled data is transmitted to the mobile device in voice form of headset profile. The Bluetooth headset module 106 would transmits a ring command to the mobile device 10. When the mobile device 10 receives the ring command, the mobile device 10 may enter the normal mode from the standby mode. Meanwhile, the Bluetooth headset module 106 and the mobile device 10 establish a SCO link. When the SCO link is established, the Bluetooth headset module 106 converts the Bluetooth audio sampled data to RF signal by using modulation in 802.15 standards and transmits the RF signal to the mobile device 10. The mobile device 10 performs audio demodulation to the received Bluetooth audio sampled data, and then the digital data can be obtained.

In step S407, the Bluetooth data/control message transmission method ends.

Figure 5:
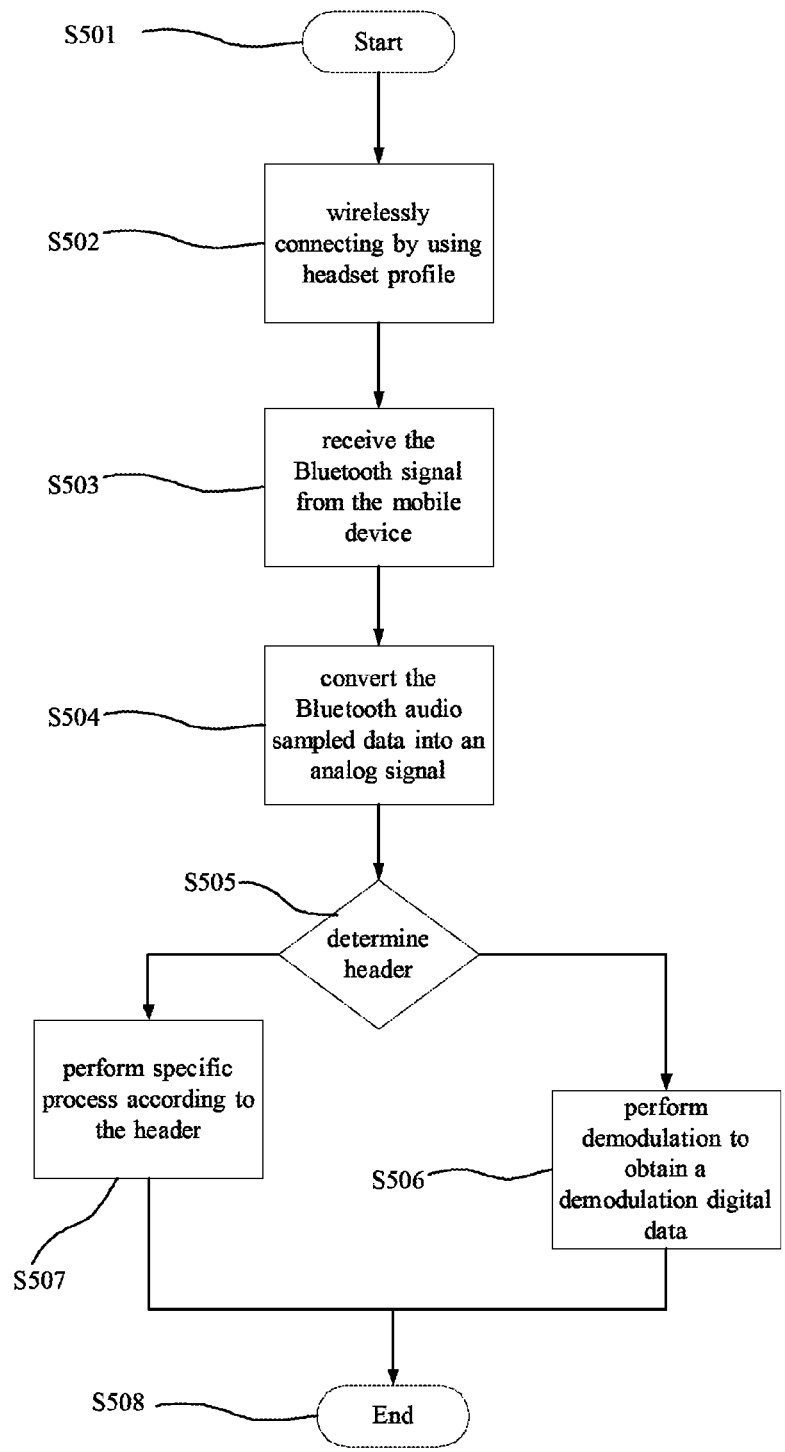
FIG. 5 illustrates a flowchart depicting the Bluetooth data/control message transmission method according to a preferred embodiment of the present invention.

FIG. 5 illustrates a flowchart depicting the Bluetooth data/control message transmission method according to a preferred embodiment of the present invention. Referring to FIG. 5, the Bluetooth data/control message transmission method uses transmitting data to the interaction device from the mobile device for example. The Bluetooth data/control message transmission method includes the steps of:

In step S501, the Bluetooth data/control message transmission method starts.

In step S502, the headset profile is used to wirelessly connect to the mobile device.

In step S503, the Bluetooth signal is received from the mobile device 10. Before the transmission, the interaction device 11 may be in the standby mode. Thus, the mobile device 10 would transmit a ring command to the interaction device 11. When the interaction device 11 receives the ring command, the interaction device 11 enters the normal mode from the standby mode. At this time, the mobile device and the Bluetooth headset module 106 of the interaction device 11 establishes the SCO link. When the SCO link is established, the mobile device 10 would serve the Bluetooth audio sampled data as a voice data, and then transmits the Bluetooth audio sampled data to the Bluetooth headset module 106 of the interaction device 11 through the 802.15 standard protocols.

In step S504, the received Bluetooth audio sampled data is converted into an analog signal. The Bluetooth headset module 106 would demodulate the received RF signal and then perform the digital-to-analog conversion to obtain an analog Bluetooth audio sampled data. The analog Bluetooth audio sampled data is the analog signal and it is outputted from the headphone port HP of the Bluetooth headset module 106.

In step S505, it is determined that the signal after the header of the analog signal is voice or data according to the header of the analog signal. If it is a data, the step S506 is performed. If it is a voice, the step S507 is performed.

In step S506, the analog signal is demodulated with an analog carrier signal to obtain a demodulated digital data. At this time, the process unit 103 can adaptively perform an operation according to the demodulated digital data.

In step S507, a specific process to the voice in the analog signal is performed according to the header, such as storing the voice or playing the voice.

In step S508, the Bluetooth data/control message transmission method ends.

In the abovementioned embodiment, the hardware in FIG. 1 and FIG. 2 is taken as an example to describe the Bluetooth data/control message transmission method in FIG. 4 and FIG. 5, people having ordinary skill in the art should know that the steps of the Bluetooth data/control message transmission method also can be implemented by software. Thus, the present invention is not limited thereto.

In summary, the spirit of the present invention is to use the headset profile in Bluetooth protocol, which is widely supported for most mobile device, to perform data transmission. Since each mobile device is practically compatible with Bluetooth device with headset profile. Thus, the device using the present invention has high compatibility. The headset profile is only adapted for audio transmission of earphone/microphone. In other words, the headset profile is purely designed for audio transmission. The present invention can perform data transmission through the headset profile. Thus, the preferred embodiment of the present invention has the advantage of:

1. Conventional Bluetooth earphone/microphone is designed for voice transmission, and it cannot be used for transmitting data. The present invention can use the Bluetooth headset to transmit data.

2. Utilizing the ring command in headset profile of Bluetooth can save power. The microcontroller of the Bluetooth headset can enter the standby mode.

3. Real sound is not required. It can transmit through electrical signal, such that user would not listen the noise.

4. Utilizing a specific signal to switch, such as header, the data and voice can use the same channel.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A Bluetooth data/control message transmission module, for connecting a mobile device through a Bluetooth protocol, the Bluetooth data/control message transmission module comprising:
    a process unit, for providing a digital data;
    a modulation module, coupled to the process unit, receiving the digital data, for modulating a digital data with an analog carrier signal to generate an analog modulated signal, wherein a frequency of the analog modulated signal is lower than an audio frequency; and
    a Bluetooth headset module, coupled to the modulation module, wireless-connected to the mobile device using a headset profile, wherein the mobile device identifies the Bluetooth headset module as a headset intercom, wherein the Bluetooth headset module samples the analog modulated signal to obtain a Bluetooth audio sampled data, and the Bluetooth headset module serves the Bluetooth audio sampled data as a voice data, and transmits the Bluetooth audio sampled data to the mobile device by the headset profile,
    wherein the mobile device performs the analog-to-digital conversion and the demodulation to the Bluetooth audio sampled data to obtain the digital data.

2. The Bluetooth data/control message transmission module according to claim 1, wherein the Bluetooth headset module includes a microphone port, wherein a sample rate for the microphone port substantially is 8 KHz, and the frequency of the analog modulated signal is lower than 4 KHz.

3. The Bluetooth data/control message transmission module according to claim 1, wherein the Bluetooth headset module establishes a synchronous connection oriented link (SCO link) with mobile device before the analog modulated signal is transmitted.

4. The Bluetooth data/control message transmission module according to claim 1, wherein, when the Bluetooth headset module receives a second Bluetooth audio sampled data, the Bluetooth headset module performs a digital-to-analog conversion to the second Bluetooth audio sampled data to obtain a analog signal, and the Bluetooth data/control message transmission module further comprises:

a demodulation module, coupled to the Bluetooth headset module and the process unit, for performing a signal demodulation to the analog signal by using the analog carrier signal to obtain a demodulated digital data,
wherein the process unit performs a specific operation according to the demodulated digital data.

5. The Bluetooth data/control message transmission module according to claim 4, wherein the demodulation module checks whether the analog signal includes a specific pattern, wherein, if the analog signal includes the specific pattern, the demodulation module demodulates a signal component after the specific pattern in the analog signal to obtain the demodulated digital data.

6. The Bluetooth data/control message transmission module according to claim 4, wherein the demodulation module checks whether the analog signal includes a voice setting pattern, wherein, when the analog signal includes the voice setting pattern, the demodulation module serves a signal component after the voice setting pattern in the analog signal as a voice and transmits the voice signal to the process unit,
wherein the process unit performs a voice operation to the voice signal according to the voice setting pattern.

7. A Bluetooth data/control message transmission method, for connecting a mobile device through a Bluetooth protocol, the Bluetooth data/control message transmission method comprising:
using a headset profile to wirelessly connect to the mobile device;
receiving a digital data;
modulating a digital data with a analog carrier signal to generate a analog modulated signal, wherein a frequency of the analog modulated signal is lower than an audio frequency;
sampling the analog modulated signal, to obtain a Bluetooth audio sampling data; and
transmitting the Bluetooth audio sampling data to the mobile device in audio form of headset profile;
wherein the mobile device performs an analog-to-digital conversion to the received Bluetooth audio sampling data, and then performs demodulation to obtain the digital data.

8. The Bluetooth data/control message transmission method according to claim 7, wherein the Bluetooth headset module includes a microphone port, and a sample rate for the microphone port substantially is 8 KHz, and the frequency of the analog modulated signal is lower than 4 KHz to prevent data loss.

9. The Bluetooth data/control message transmission method according to claim 7, further comprising:
establishing a synchronous connection oriented link (SCO link) with the mobile device;
receiving a second Bluetooth audio sampled data;
converting the second Bluetooth audio sampled data into a analog signal; and
demodulating the analog signal by using the analog carrier signal to obtain a demodulated digital data.

10. The Bluetooth data/control message transmission method according to claim 7, wherein modulating the digital data with the analog carrier signal comprises:
packing the digital data into a package, wherein the package includes a header, a trailer, a bit stream and a parity check;
providing a header analog signal, a first logic analog signal, a second logic analog signal and a trailer analog signal;
sequentially sending the header analog signal, the first logic analog signal or second logic analog signal corresponding to the bit stream, the first logic analog signal or second logic analog signal corresponding to the parity check and the trailer analog signal to serve as the analog modulated signal.

11. The Bluetooth data/control message transmission method according to claim 7, wherein, before transmitting the Bluetooth audio sampling data to the mobile device in audio form of headset profile, the method further comprises:
transmitting a ring command to the mobile device to wake up the mobile device; and
establishing a (SCO link) with the mobile device.

12. The Bluetooth data/control message transmission method according to claim 7, further comprising:
receiving a second Bluetooth audio sampled data;
converting the second Bluetooth audio sampled data into an analog signal; and
determining whether the analog signal includes a specific pattern,
wherein, if the analog signal includes the specific pattern, demodulating a signal component after the specific pattern to obtain a demodulated digital data.

13. The Bluetooth data/control message transmission method according to claim 7, further comprising:
receiving a second Bluetooth audio sampled data;
converting the second Bluetooth audio sampled data into an analog signal; and
determining whether the analog signal includes a voice setting pattern,
wherein, when the analog signal includes the voice setting pattern, serving a signal component after the voice setting pattern as a voice signal; and
performing a voice operation to the voice signal according to the voice setting pattern.

14. An interaction system, comprising:
a mobile device, having a application software, wherein the mobile device supports Bluetooth protocol;
a interaction device, comprising a Bluetooth data/control message transmission module, the Bluetooth data/control message transmission module comprising:
a process unit, for providing a digital data;
a modulation module, coupled to the process unit, receiving the digital data, for modulating a digital data with a analog carrier signal to generate a analog modulated signal, wherein a frequency of the analog modulated signal is lower than an audio frequency; and
a Bluetooth headset module, coupled to the modulation module, wireless-connected to the mobile device using a headset profile, wherein the mobile device identifies the Bluetooth headset module as a headset intercom, wherein the Bluetooth headset module samples the analog modulated signal to obtain a Bluetooth audio sampled data, and the Bluetooth headset module serves the Bluetooth audio sampled data as a voice data, and transmits the Bluetooth audio sampled data to the mobile device by the headset profile,
wherein the mobile device performs the analog-to-digital conversion and the demodulation to the Bluetooth audio sampled data to obtain the digital data
wherein the mobile device displays a specific image on a screen of the mobile device according to the digital data and the performing application software.

15. The interaction system according to claim 14, wherein the Bluetooth headset module includes a microphone port, and a sample rate for the microphone port substantially is 8 KHz, and the frequency of the analog modulated signal is lower than 4 KHz.

16. The interaction system according to claim 14, wherein, when the Bluetooth headset module receives a second Bluetooth audio sampled data, the Bluetooth headset module performs a digital-to-analog conversion to the second Bluetooth audio sampled data to obtain an analog signal, and the Bluetooth data/control message transmission module further comprises:
- a demodulation module, coupled to the Bluetooth headset module and the process unit, for performing a signal demodulation to the analog signal with the analog carrier signal to obtain a demodulated digital data,
- wherein the process unit performs a specific operation according to the demodulated digital data.

17. The interaction system according to claim 16, wherein the demodulation module checks whether the analog signal includes a specific pattern, wherein, when the analog signal includes the specific pattern, the demodulation module demodulates a signal component after the specific pattern in the analog signal to obtain the demodulated digital data.

18. The interaction system according to claim 16, wherein the demodulation module checks whether the analog signal includes a voice setting pattern, wherein, when the analog signal includes the voice setting pattern, the demodulation module serves a signal component after the voice setting pattern in the analog signal as a voice signal and transmits the voice signal to the process unit,
- wherein the process unit performs a voice operation to the voice signal according to the voice setting pattern.

* * * * *